US012639867B2

(12) United States Patent
Bishop

(10) Patent No.: US 12,639,867 B2
(45) Date of Patent: *May 26, 2026

(54) IMAGING SYSTEM AND METHOD FOR GENERATING A FINAL DIGITAL IMAGE VIA APPLYING A PROFILE TO IMAGE INFORMATION

(71) Applicant: Leica Camera AG, Wetzlar (DE)

(72) Inventor: Thomas Edward Bishop, San Francisco, CA (US)

(73) Assignee: Leica Camera AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,508

(22) Filed: Nov. 17, 2023

(65) Prior Publication Data

US 2024/0087198 A1     Mar. 14, 2024

Related U.S. Application Data

(63) Continuation of application No. 17/705,678, filed on Mar. 28, 2022, now Pat. No. 11,893,668.

(60) Provisional application No. 63/168,768, filed on Mar. 31, 2021.

(51) Int. Cl.
| | |
|---|---|
| *G06T 11/60* | (2026.01) |
| *G06T 3/10* | (2024.01) |
| *G06T 7/00* | (2017.01) |
| *G06T 7/571* | (2017.01) |
| *H04N 19/124* | (2014.01) |
| *H04N 23/80* | (2023.01) |

(52) U.S. Cl.
CPC ............... *G06T 11/60* (2013.01); *G06T 3/10* (2024.01); *G06T 7/571* (2017.01); *G06T 7/97* (2017.01); *H04N 19/124* (2014.11); *H04N 23/80* (2023.01)

(58) Field of Classification Search
CPC ....... G06T 11/60; G06T 3/0056; G06T 7/571; G06T 7/97; G06T 2207/100024; G06T 2207/10028; G06T 2207/20021; G06T 2207/30204; G06T 5/001; G06T 5/20; G06T 5/50; H04N 19/124; H04N 23/617; H04N 23/65; H04N 23/80; H04N 5/2621; H04N 17/002; H04N 5/2226
See application file for complete search history.

(56) References Cited

U.S. PATENT DOCUMENTS

| | | | | |
|---|---|---|---|---|
| 11,294,422 B1 * | 4/2022 | Srikanth | .............. | H04N 23/843 |
| 11,632,498 B1 * | 4/2023 | Mowry | .................. | G03B 17/48 |
| | | | | 348/222.1 |
| 11,893,668 B2 * | 2/2024 | Bishop | .................... | H04N 23/80 |
| 2007/0130095 A1 * | 6/2007 | Peot | ....................... | G06T 3/4053 |
| | | | | 706/20 |
| 2013/0258151 A1 * | 10/2013 | Ayers | ..................... | H04N 25/78 |
| | | | | 348/E5.091 |
| 2017/0046821 A1 * | 2/2017 | Hayasaka | ................. | G06T 5/73 |
| 2019/0222752 A1 * | 7/2019 | Burstein | .............. | H04N 5/2224 |

(Continued)

*Primary Examiner* — Jin Cheng Wang

(74) *Attorney, Agent, or Firm* — Fishman Stewart PLLC

(57) ABSTRACT

A method of generating an image may include obtaining a profile of a combination of a full-frame camera and a lens; obtaining image information from an electronic sensor of a mobile electronic device; and/or generating, via an electronic control unit of the mobile electronic device, a final digital image via applying a profile of the one or more profiles to the image information.

17 Claims, 12 Drawing Sheets
(9 of 12 Drawing Sheet(s) Filed in Color)

(56) References Cited

U.S. PATENT DOCUMENTS

| | | | | |
|---|---|---|---|---|
| 2019/0251689 A1* | 8/2019 | Wang | | G16H 30/20 |
| 2019/0328208 A1* | 10/2019 | Kashima | | A61B 1/00043 |
| 2020/0106929 A1* | 4/2020 | Doyle | | A61B 3/1025 |
| 2021/0082661 A1* | 3/2021 | Bloom | | H01J 37/244 |
| 2021/0136284 A1* | 5/2021 | Gopalakrishna | | H04N 23/75 |
| 2021/0233210 A1* | 7/2021 | Elron | | G06T 3/4053 |
| 2021/0366411 A1* | 11/2021 | Yang | | G09G 5/026 |
| 2021/0389601 A1* | 12/2021 | O'Toole | | G02B 27/0944 |
| 2021/0404964 A1* | 12/2021 | Schwedt | | G02B 21/008 |
| 2022/0086309 A1* | 3/2022 | Kim | | H04N 23/633 |
| 2022/0114713 A1* | 4/2022 | Liu | | G06T 5/20 |
| 2022/0261966 A1* | 8/2022 | Liu | | G06T 5/20 |
| 2024/0080544 A1* | 3/2024 | Tanaka | | H04N 23/64 |

* cited by examiner

IMAGING SYSTEM AND METHOD FOR GENERATING A FINAL DIGITAL IMAGE VIA APPLYING A PROFILE TO IMAGE INFORMATION

CROSS-REFERENCE TO RELATED APPLICATION

This application is a continuation application of U.S. patent application Ser. No. 17/705,678, filed Mar. 28, 2022, which claims the benefit of U.S. Provisional Patent Application Ser. No. 63/168,768, filed on Mar. 31, 2021, the disclosure of which both are hereby incorporated by reference in their entirety.

TECHNICAL FIELD

The present disclosure generally relates to imaging systems and methods, including imaging systems and methods that may be used in connection with smartphone cameras, such as to simulate full-frame cameras and lenses, for example.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

It may not be feasible or practical to incorporate a full-frame camera and lens into a smartphone, but it may be desirable to simulate one or more full-frame cameras and lenses for images captured via smartphone cameras.

There is a desire for solutions/options that minimize or eliminate one or more challenges or shortcomings of imaging systems and methods. The foregoing discussion is intended only to illustrate examples of the present field and is not a disavowal of scope.

SUMMARY

In exemplary illustrative embodiments, a method of generating an image may include obtaining a profile of a combination of a full-frame camera and a lens; obtaining image information from an electronic sensor of a mobile electronic device; and/or generating, via an electronic control unit of the mobile electronic device, a final digital image via applying a profile of the one or more profiles to the image information.

With some example embodiments, an imaging system may include a plurality of electronic profiles of combinations of full-frame cameras and lenses stored in an electronic memory, and a mobile electronic device configured to obtain image information via an electronic sensor of the mobile electronic device. The mobile electronic device may be configured to generate, via an electronic control unit of the mobile electronic device, a final digital image via applying a profile of the plurality of electronic profiles to the image information.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 10A-12 are representations of illustrative embodiments of point spread functions (PSFs) associated with a full-frame camera and lens.

DETAILED DESCRIPTION

Reference will now be made in detail to illustrative embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Full-frame cameras 100 and lenses 102 (see, e.g., FIG. 1) may provide a bokeh for at least some images. For example, a bokeh may include the aesthetic effects of the blurring in out-of-focus portions of an image (see, e.g., image 110 in FIG. 5B). A variety of components of full-frame cameras and lenses, such as aperture blades, optical vignetting, spherical aberrations, and/or chromatic aberrations, among others, may impact how a camera/lens renders a bokeh.

Figures 3, 3A, 4, 4A:
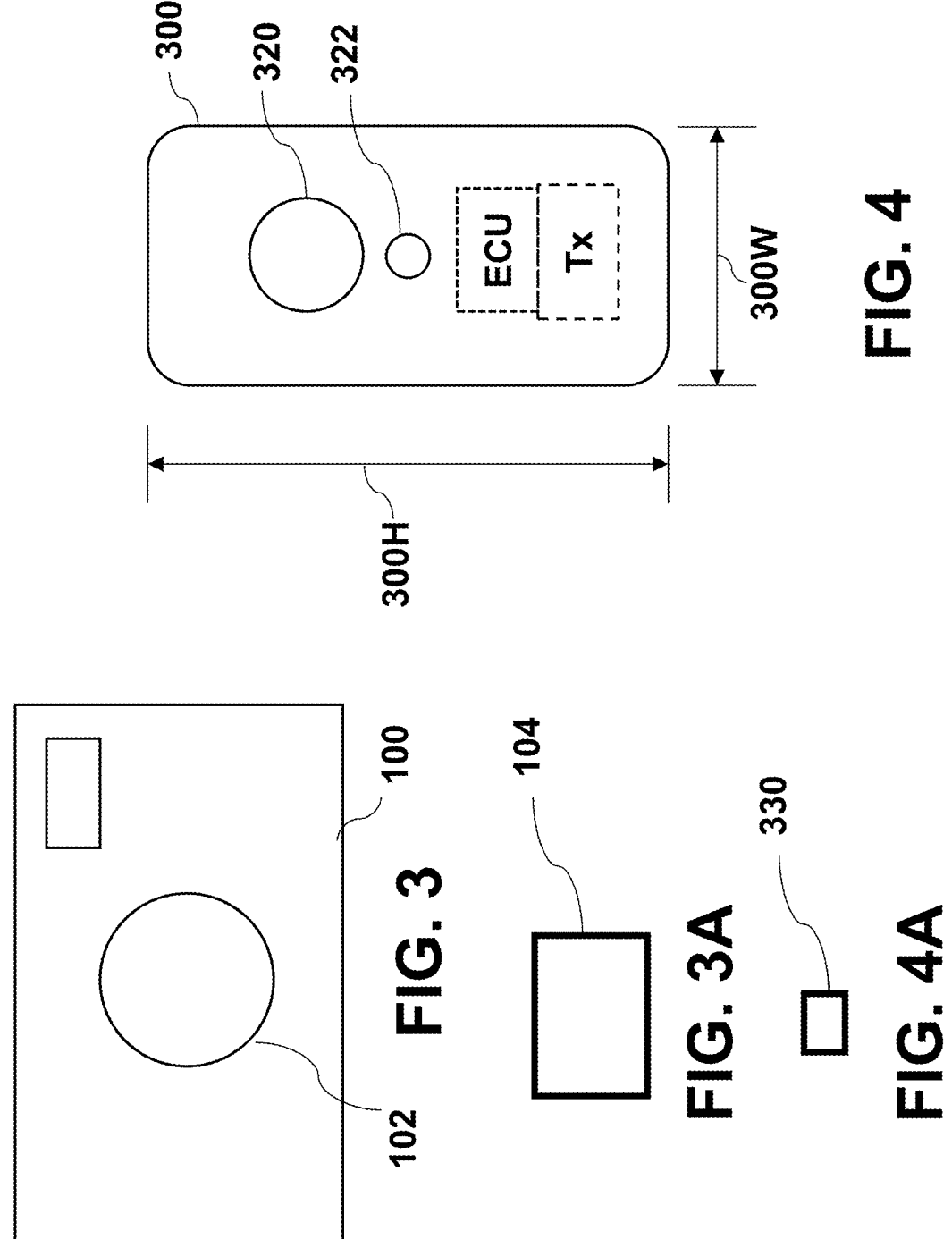
FIG. 3 is a front view generally illustrating an embodiment of a full-frame camera.
FIG. 3A is a representation of an embodiment of a sensor of a full-frame camera.
FIG. 4 is a front view generally illustrating an embodiment of a mobile electronic device.
FIG. 4A is a representation of an embodiment of a sensor of a mobile electronic device.
Figures 5A, 5B, 5C:
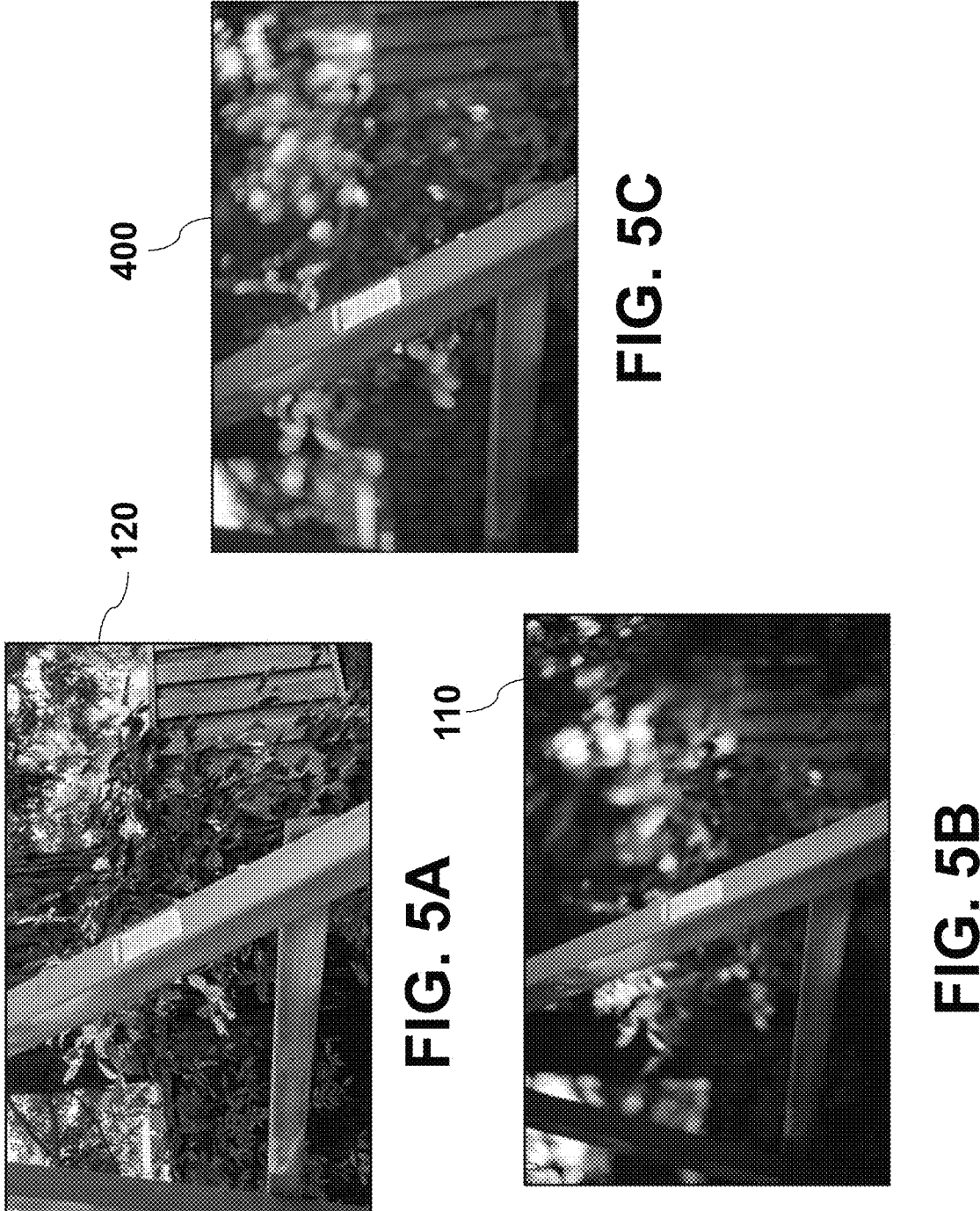
FIGS. 5A-5C are images generated/captured via another mobile electronic device, an exemplary embodiment of a full-frame camera and lens, and an exemplary embodiment of a mobile electronic device, respectively.

Smartphone cameras usually have much smaller image sensors having significantly less surface area to capture light than full-frame cameras 100 (see, e.g., FIG. 3A compared to FIG. 4A), and may produce an almost infinite depth-of-field that may render background portions of images almost as sharp as the subject/target itself such that no part of the image appears out of focus (see, e.g., image 120 in FIG. 5A). While some smartphone cameras have modes that blur out background portions of an image (e.g., a portrait mode), the blurring does not simulate the optical effects associated with a full-frame camera and lens combination, such as optical vignetting, chromatic aberrations, spherical aberrations, and/or various other characteristics of bokeh that photographers may use to achieve a particular look in their art. Instead, the smartphone blurring may be uniform and grain free, which may provide a plastic look to the blurring, with little or no variation for the viewer's eye.

With embodiments of the current disclosure, a mobile electronic device 300 may be configured to simulate one or more effects of one or more full-frame cameras 100, lenses 102, and/or full-frame camera and lens combinations (see, e.g., image 110 from a full-frame camera and lens combination in FIG. 5B), such as bokehs associated with such combinations (see, e.g., simulated effects in image 400 in FIG. 5C). Moreover, use of different simulation profiles may be possible, wherein each simulation profile represents a unique full-frame camera and lens combination. For each simulation profile, effectively simulating the bokeh of a full-frame camera 100 and lens 102 may include obtaining a raw image, obtaining accurate depth information, such as on a pixel-by-pixel basis (e.g., instead of applying uniform blurring), and/or obtaining a digitized/electronic profile of a full-frame camera and lens combination. Accurate depth information may, for example, be provided via a depth map. Simulating the bokeh may include applying the accurate/modified depth information and the profile to the raw image.

Figures 1, 2:
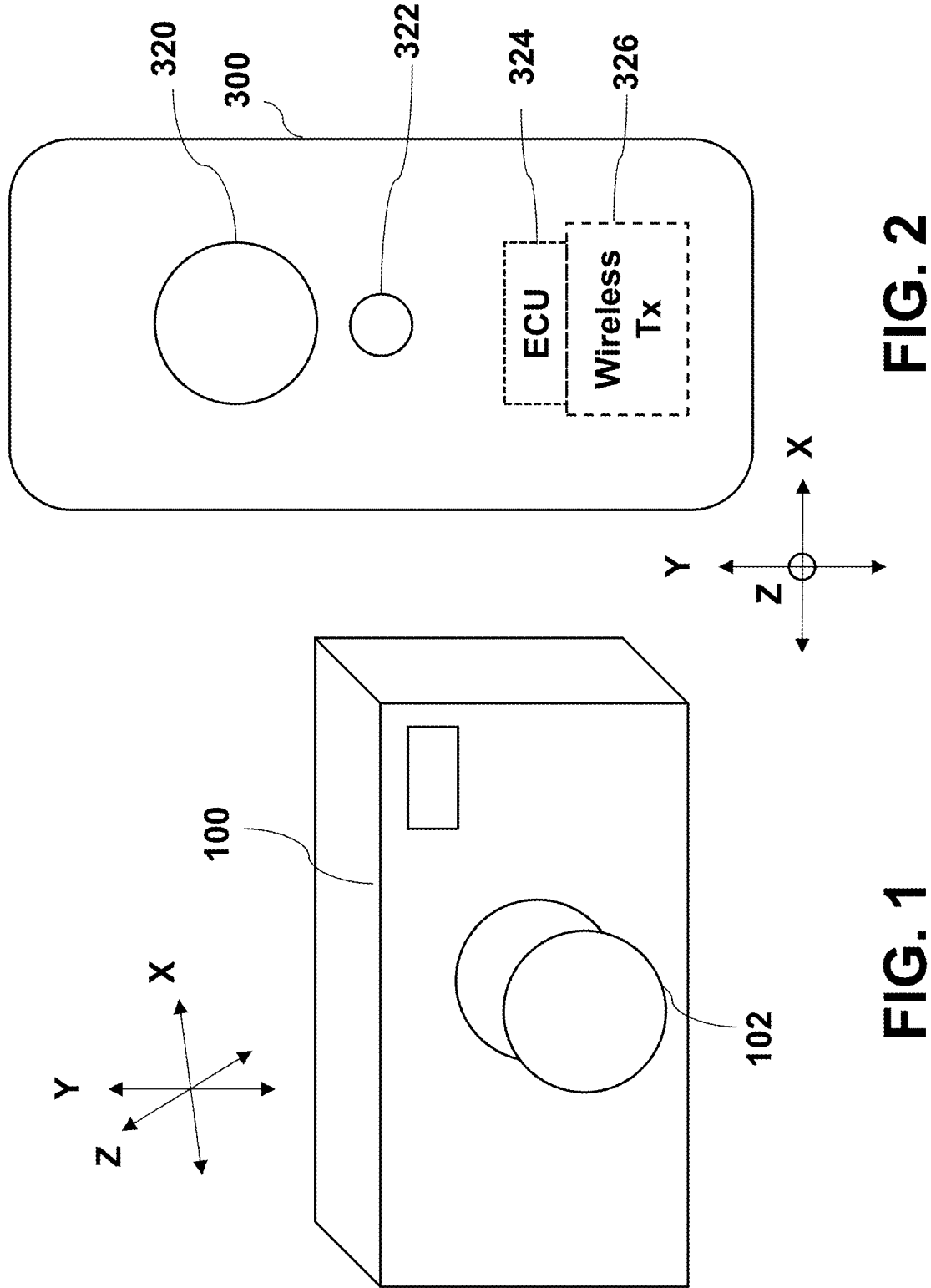
FIG. 1 is a front perspective view generally illustrating an embodiment of a full-frame camera.
FIG. 2 is a front view generally illustrating an embodiment of a mobile electronic device.
Figure 4B:
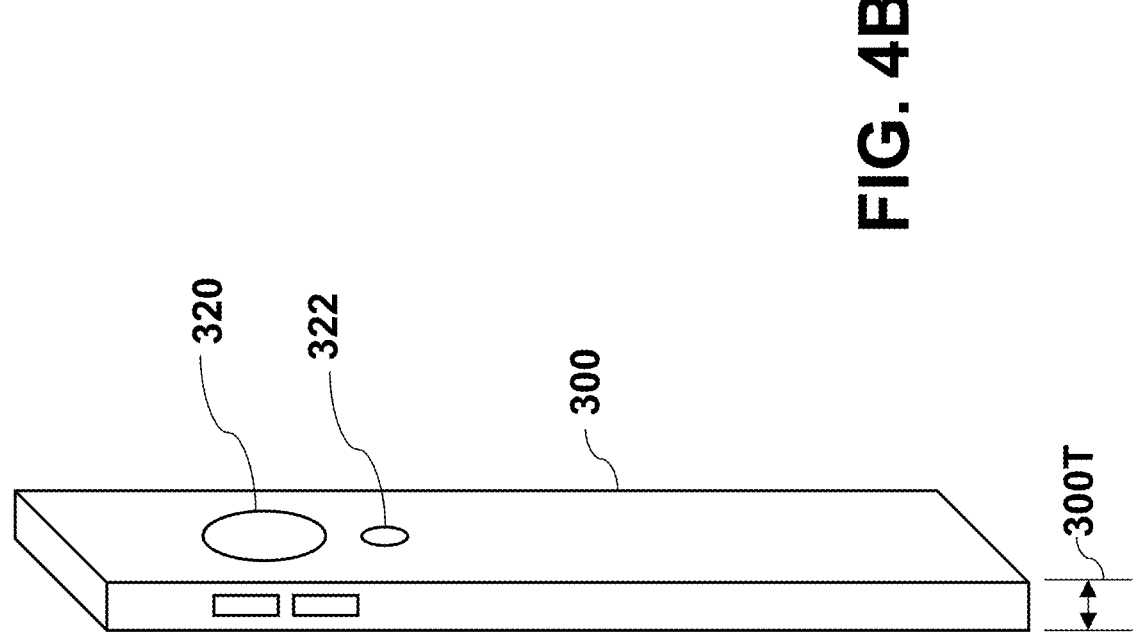
FIG. 4B is a perspective view generally illustrating an embodiment of a mobile electronic device.

In exemplary embodiments, such as generally illustrated in FIG. 2, an imaging system 200 may include a mobile electronic device 300 (e.g., a smartphone) that may include a first electronic sensor 320, a second electronic sensor 322, and/or an electronic control unit (ECU) 324. The mobile electronic device 300 may, for example, include a wireless/cellular transceiver/radio/modem 326 that may be connected to, incorporated with, and/or in communication with the ECU 324 and may be configured to communicate with a cellular network and/or another wireless network (e.g., the mobile electronic device may be configured as a cellular phone). The mobile electronic device 300 may include a memory 332, a display 334, and/or a processor 336 (see, e.g., FIG. 8). The mobile electronic device 300 may be relatively thin (see, e.g., FIG. 4B). For example and without limitation, the mobile electronic device 300 may have a thickness 300T of about 1 inch (25.4 mm) or less, about 0.5 inches (12.7 mm) or less, or about 0.4 inches (10.6 mm) or less, among other thicknesses. The mobile electronic device 300, in some examples, may include a height 300H of at least 4 inches (101.6 mm) and/or a width of at least 2 inches (50.8 mm). For example and without limitation, the mobile electronic device 300 may be at least five times as wide as it is thick and/or at least 10 times as tall as it is thick.

With exemplary embodiments, such as generally illustrated in FIGS. 1, 3, and 3A, a full-frame camera and lens combination may be relatively thick and/or may include a relatively large color sensor 104. For example and without limitation, a full-frame camera 100 may include a depth/thickness of at least 1.5 inches (38 mm) thick or more, and/or a lens may include a depth/thickness of 2 inches (51 mm) or more (e.g., about 3 inches (76 mm)), which may provide a combination of a full-frame camera 100 and a lens 102 with a combined depth/thickness of about 3.5 inches (89 mm) or more. Additionally or alternatively, an area of the color sensor 104 of the full-frame camera 100 may, for example and without limitation, be at least 1.24 in$^2$ (800 mm$^2$), such as about 1.34 in$^2$ (864 mm$^2$).

In exemplary embodiments, such as generally illustrated in FIGS. 4 and 4A, embodiments of a color sensor 330 of a first electronic sensor 320 of a mobile electronic device 300 may be significantly smaller than that of a full-frame camera 100. For example and without limitation, an area of a color sensor 330 of an embodiment of a mobile electronic device 300 may be less than 1 in$^2$ (645.16 mm$^2$), less than 0.5 in$^2$ (322.58 mm$^2$), and/or about 0.16 in$^2$ (100 mm$^2$) to about 0.23 in$^2$ (150 mm$^2$), such as about 0.19 in$^2$ (123 mm$^2$). The color sensor 330 of at least some embodiments of a mobile electronic device 300 may be significantly larger than other mobile electronic devices (e.g., other smartphones). For example and without limitation, the Apple iPhone 12 Pro Max may include a sensor area of about 0.05 in$^2$ (35 mm$^2$). A smaller color sensor may be capable of capturing less (e.g., proportionally less) light at a time than a larger color sensor.

In some circumstances, one or more chromatic aberration factors of a full-frame camera/lens 100/102 may be evaluated via multi-channel PSFs (e.g., simulated across several wavelengths). Aberration intensity may vary with distance between the camera 100 and a display 430. PSFs that are not centered with a chief ray may appear out of focus. In focus PSFs may include color aberrations.

Figure 6:
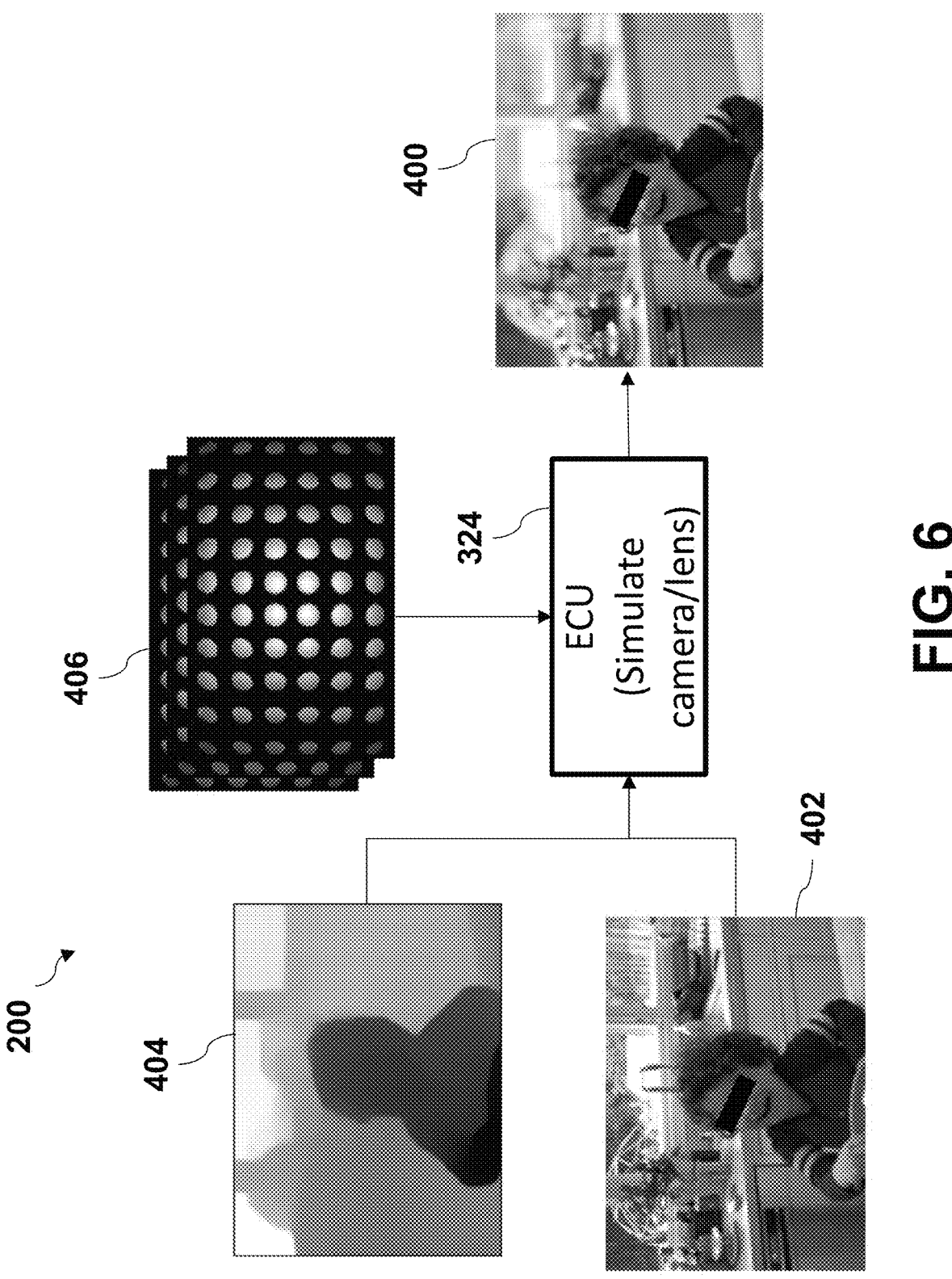
FIG. 6 is a diagram illustrating an exemplary embodiment of an imaging method.
Figure 7:
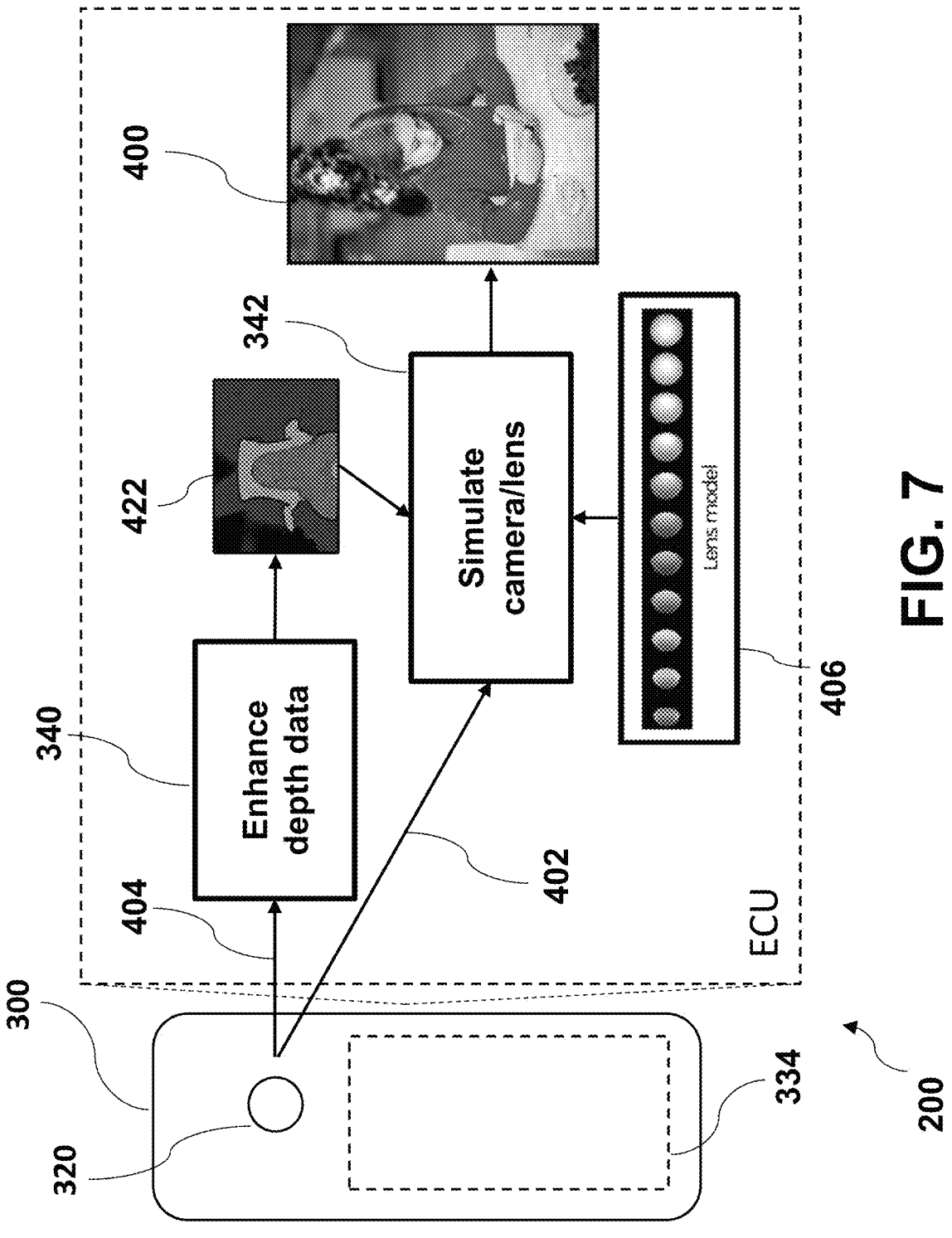
FIG. 7 is a diagram illustrating an exemplary embodiment of an imaging method.

With exemplary embodiments, such as generally illustrated in FIGS. 6 and 7, an imaging system 200 (e.g., an ECU 324 of a mobile electronic device 300) may be configured to obtain an initial image 402, obtain depth information 404, obtain a profile 406 of a full-frame camera 100, a lens 102, and/or a combination of a full-frame camera 100 and a lens 102, enhance the depth information 404 to obtain modified depth map/information 422 (block 340), simulate the camera 100 and/or lens 102 (block 342), and/or generate a final digital image 400 that includes simulated effects of the full frame camera 100 and/or the lens 102. The profile 406 may include one or more PSFs 408 (e.g., PSF information).

Figure 8:
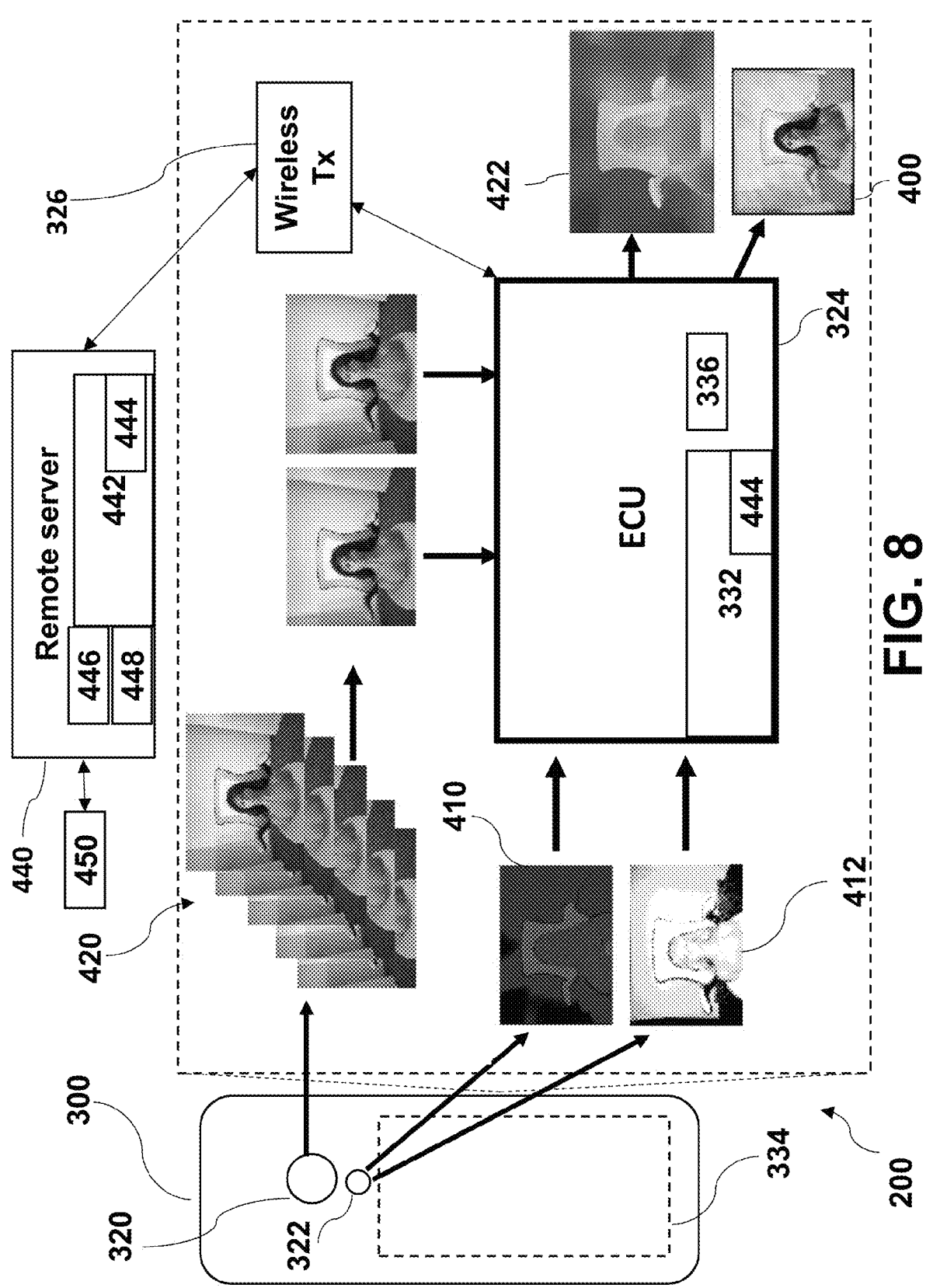
FIG. 8 is a diagram illustrating an exemplary embodiment of an imaging method, including generating enhanced depth information/a depth map.
Figure 9:
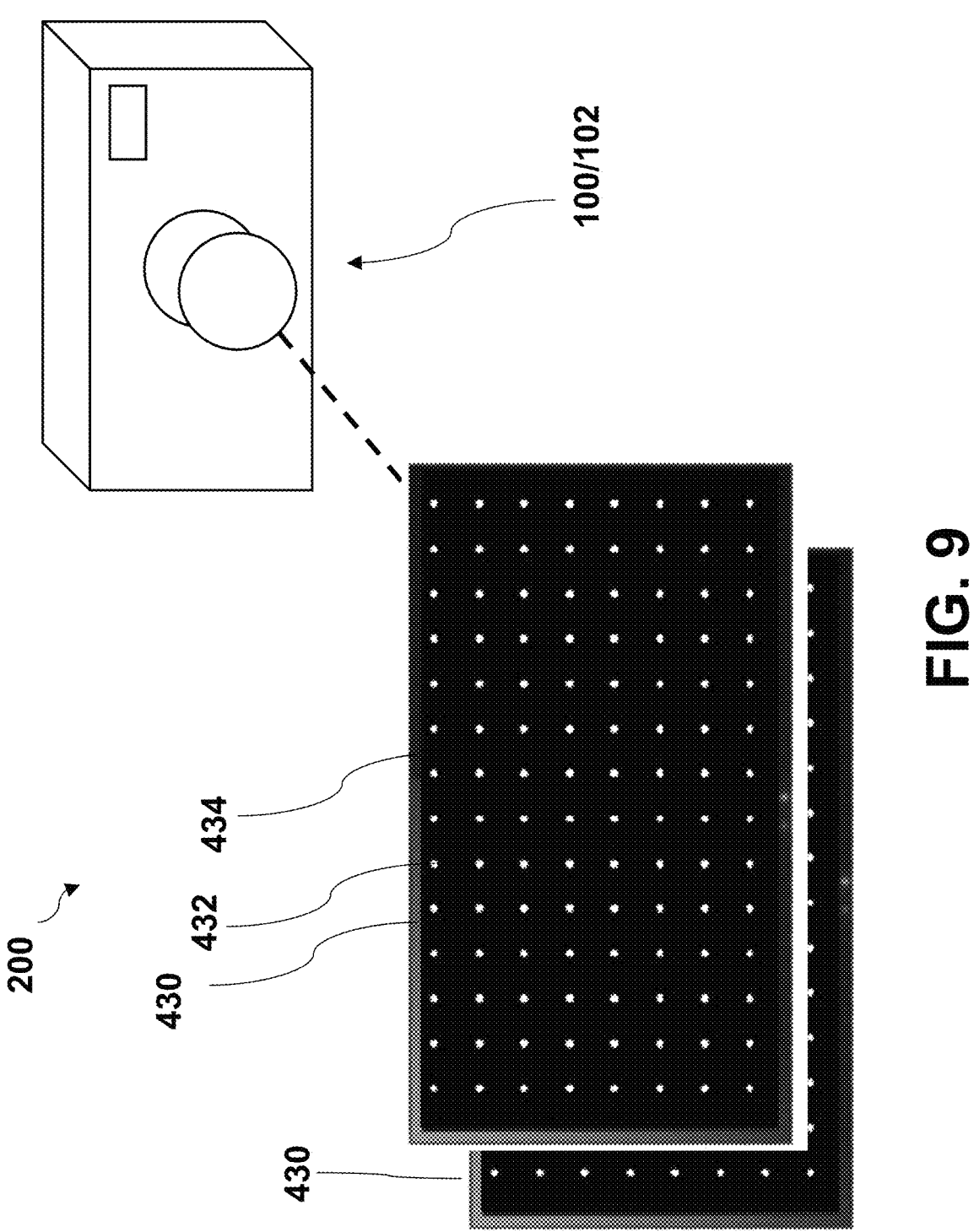
FIG. 9 is a representation of illustrative embodiments of a full-frame camera and an electronic display.
Figures 10A, 10B, 11A, 11B:
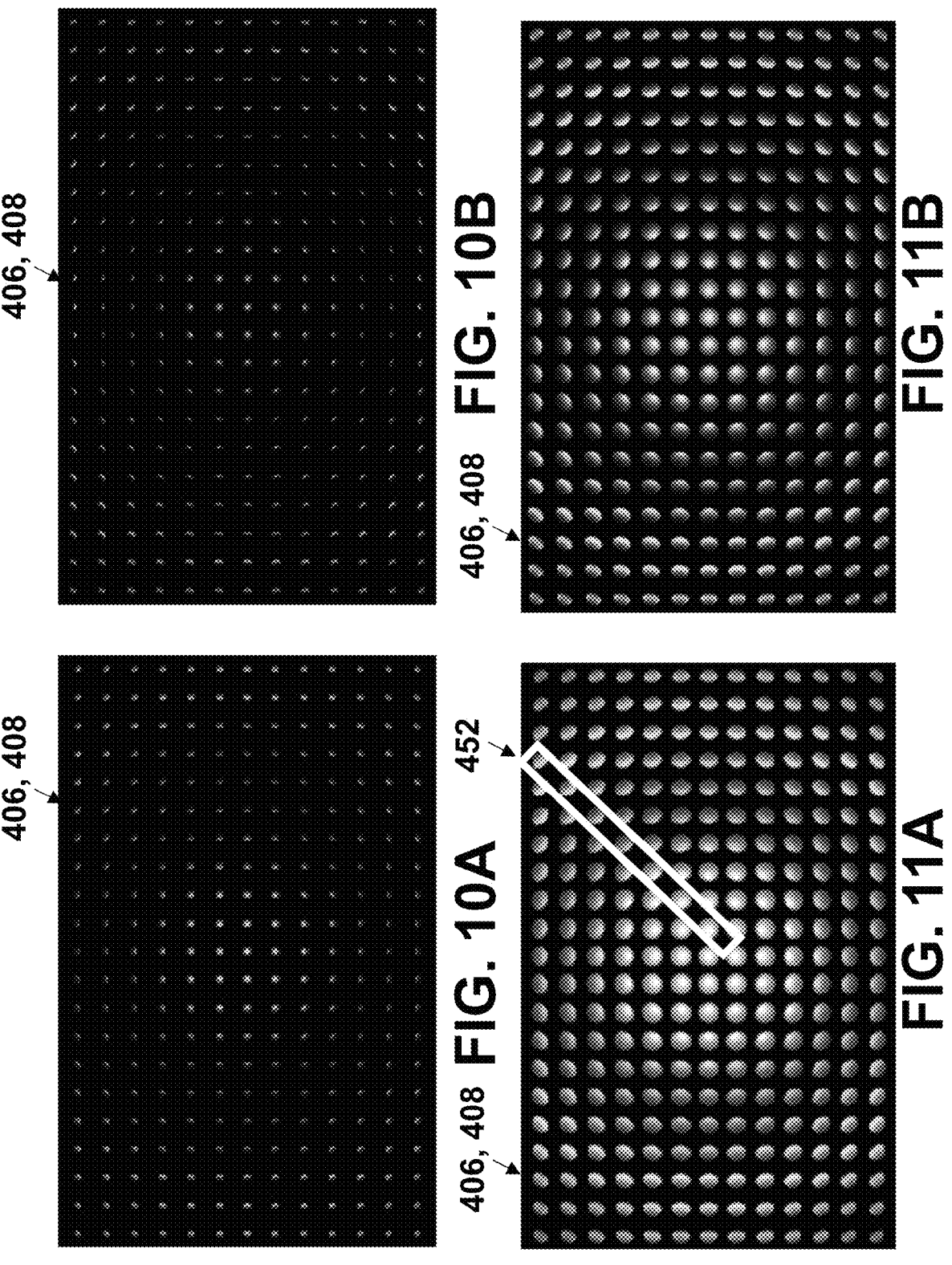

In exemplary embodiments, such as generally illustrated in FIG. 8, depth information 404 may be obtained via a second electronic sensor 322, which may include a time-of-flight (TOF) sensor. The depth information 404 may include depth data 410 and/or depth confidence information 412. A plurality of images 420 may be captured via the first electronic sensor 320 (e.g., via the color sensor 330) of the mobile electronic device 300. The ECU 324 may select two or more images of the plurality of images 420 for disparity calculations. The ECU 324 may utilize the depth information 404, which may include the depth data 410 and/or the depth confidence information 412, and/or the disparity calculations to generate modified/enhanced depth information and/or a depth map 422 (block 340).

In exemplary embodiments, a profile 406 of a full-frame camera 100 and/or a lens 102 may include one or more point spread functions (PSFs) 408, such as generally illustrated in FIGS. 10A-11B. Obtaining a profile 406 may include operating the full-frame camera 100 and/or the lens 102 to generate one or more PSFs 408. For example, the full-frame camera 100 and the lens 102 may be operated to capture light from and/or one or more profile images of an electronic display 430, such as at a plurality of distances (see, e.g., FIG.

9). The electronic display 430 may, for example and without limitation, include an organic light emitting diode (OLED) display. The electronic display 430 may display a plurality of white circles 432 on a black background 434. Each PSF 408 may include the characteristics of a respective circle 432, such as the shapes, chromatic aberrations, fringing, and/or non-uniform intensity distribution, among others (see, e.g., FIGS. 10A-11B). The characteristics may vary across the field of view (e.g., for a particular depth/distance between the camera/lens 100/102 and the display 430) and/or may vary depending on the depth/distance between the camera/lens 100/102 and the display 430. A profile 406 may include PSF information, which may be stored in a grid/matrix (X, Y) format. The PSF information may include a PSF 408 for each respective depth and focal length (e.g., layers of PSFs), and/or PSF information may be stored in a three-dimensional matrix (X, Y, Z/depth). The PSF 408 (and the characteristics thereof) may be utilized (e.g., by a mobile electronic device 300) to simulate the behavior of the camera/lens 100/102. Information in a PSF 408 may include light intensity information, which may, for example, include a single value or multiple values (e.g., three color values RGB).

With exemplary embodiments, such as generally illustrated in FIGS. 10A-11B, initial PSF information may be modified, such as by the mobile electronic device 300 and/or a remote computer server 440. For example and without limitation, initial PSF information, such as shown FIG. 10A (focus 1.2 m, depth 1.4 m) and FIG. 11A (focus 1.2 m, depth 2.5 m), may be normalized and/or white balanced, such as if the PSF information is simulated, to generate modified PSF information, such as shown in FIG. 10B (focus 1.2 m, depth 1.4 m) and FIG. 11B (focus 1.2 m, depth 2.5 m).

In some examples, a library 444 (e.g., an electronic library) of profiles and/or PSFs 408 for various cameras 100, lenses 102, and/or camera-lens combinations may be created and made accessible to the mobile electronic device 300. For example and without limitation, some or all of the library 444 may be uploaded to and/or stored on a memory 332 of the mobile electronic device 300. Additionally or alternatively, the some or all of the library 444 may be stored on memory 442 of a remote server 440, and the mobile electronic device 300 may be configured to communicate (e.g., wirelessly via a global computer and/or cellular network) with the remote server 440 to obtain profiles and/or PSF information. The library 444 may include PSFs 408 for some or all locations (X,Y), depths (Z), and/or focal lengths. A remote server 440 may include a remote server ECU 446 and/or a processor 448. The ECU 446 may include and/or be connected to the memory 442 and/or the processor 448.

In some illustrative embodiments, profiles 406 and/or PSFs 408 may be generated via simulation. For example, physical dimensions and characteristics of the camera 100 and/or the lens 102, lighting information, and/or depth information, among other information, may be provided to a PSF simulator 450, such as, for example only, Zemax OpticStudio offered by Zemax LLC. The PSF simulator 450 may utilize the input information to generate simulated information to generate PSFs 408 that may simulate PSFs generated directly via a camera/lens 100/102. A PSF simulator 450 may, in some examples, be included with, communicate with, and/or be connected to (e.g., via wired connection, wireless connection, removable media, etc.) a remote server 440 (see, e.g., FIG. 8).

Figure 12:
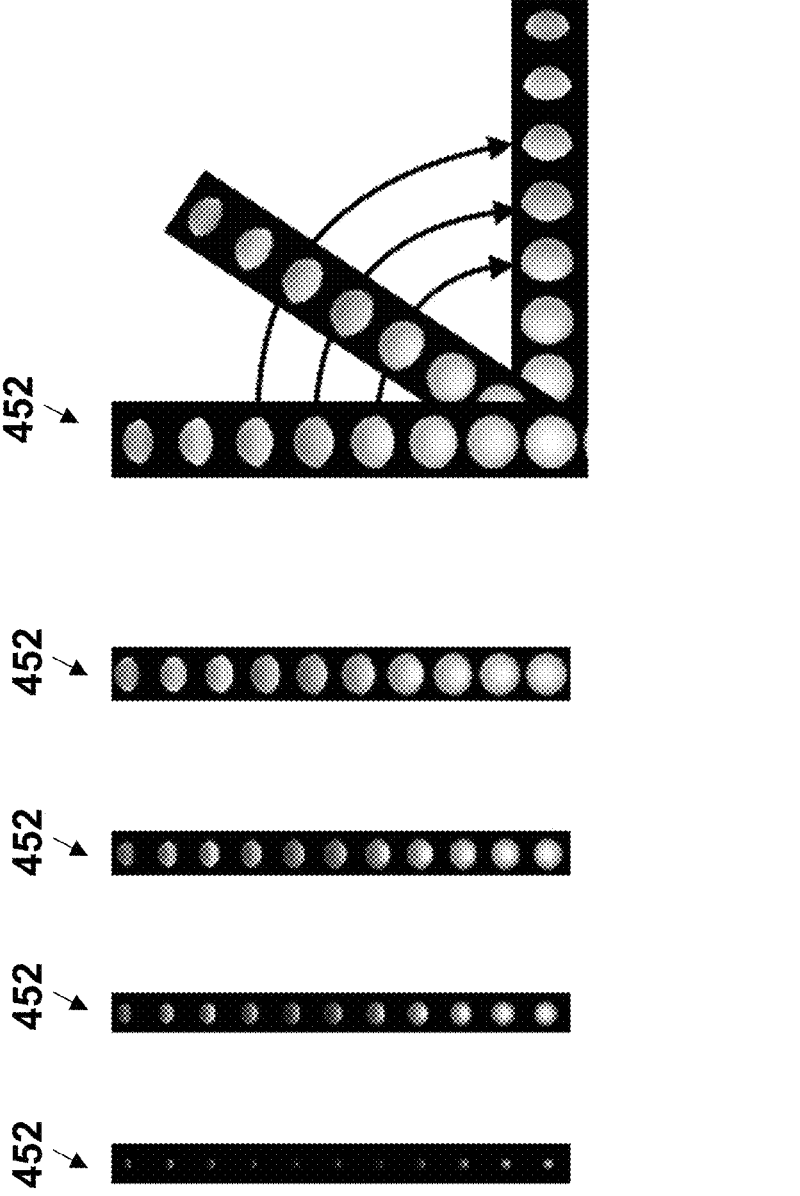

In exemplary embodiments, such as generally illustrated in FIG. 12, a profile 406 may include PSF information that may be stored on the mobile electronic device 300 and/or a remote server 440 in a one-dimensional matrix (e.g., for each depth and focal length), which may allow for more efficient application of PSF information and/or for denser/higher quality PSF information to be utilized by and/or stored on a mobile electronic device 300. For example, PSF information may be stored as a function of radial position from the center (e.g., instead of X, Y position), effectively reducing a two-dimensional grid to a one-dimensional strip/array/matrix 452. The strip 452 may then be "rotated" about a center to provide PSF information covering a circular field on the sensor 320, which may approximate a full set of PSFs 408 across this field. For a rotationally symmetric lens 102, using the approximation may be effectively identical to full PSF information. The PSF information may still include three values (for R, G, B) even when stored in a one-dimensional strip/array/matrix 452.

With exemplary embodiments, a first order approximation of a PSF may use nearest neighbor (NN) PSF sampling and/or scaling for depth. A first refinement may include the ECU 324 utilizing bi-linear spatial sampling and/or normalized spatial scaling. A second refinement may include the ECU 324 conducting tri-linear spatial and/or depth sampling and scale/rotation correction. A third refinement may include the ECU 324 conducting an approximate basis decomposition and/or scale/rotation correction. Separable approximations may provide additional refinement. A fourth refinement, which may improve processing speed, may include the ECU 324 conducting a reduced sampling technique (e.g., a reduced stochastic sampling technique). A fifth refinement may include the ECU 324 conducting multi-scaling.

Figure 13:
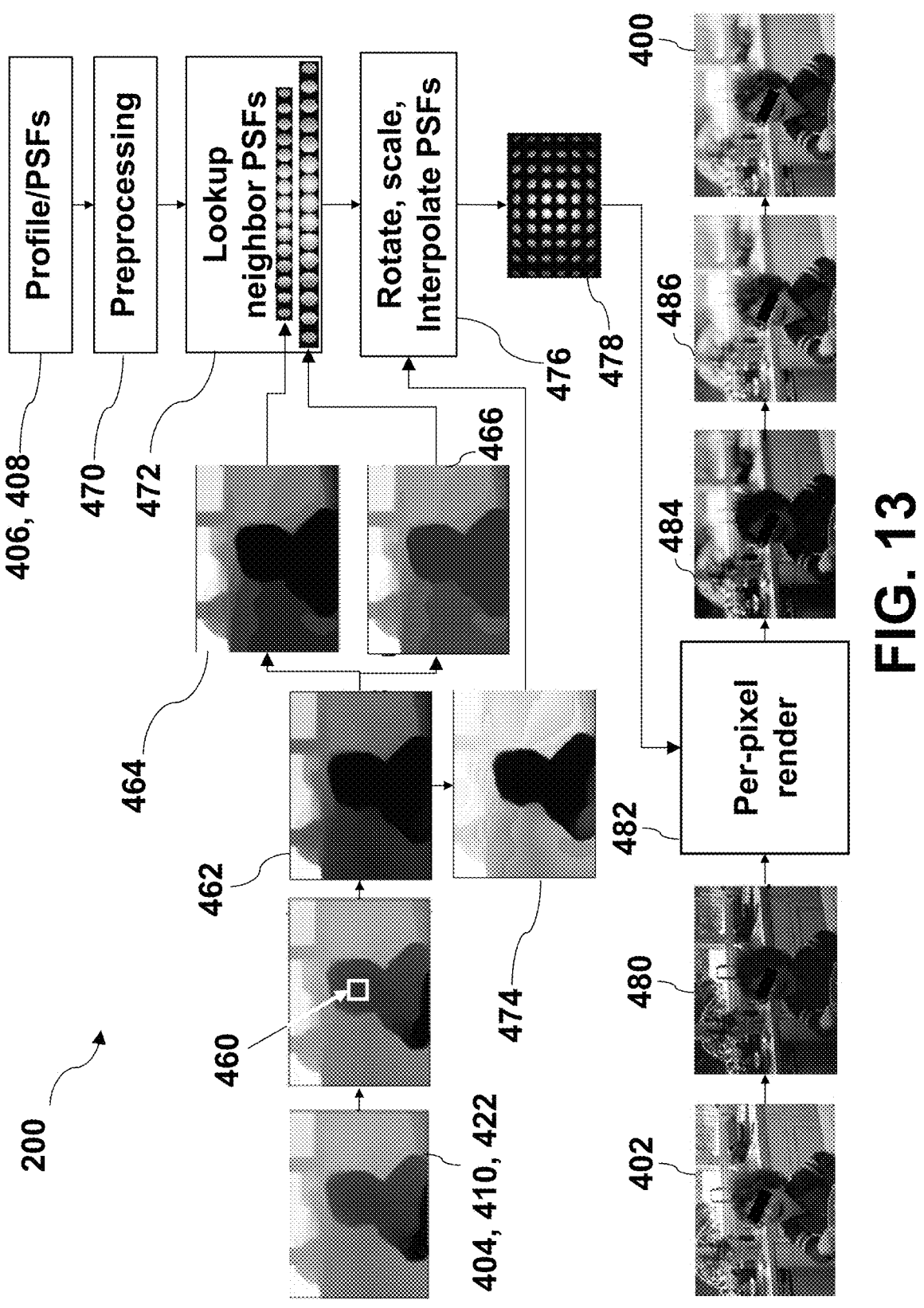
FIG. 13 is a flow diagram illustrating portions of an exemplary embodiment of an imaging method.

An exemplary embodiment of an imaging method is generally illustrated in FIG. 13. The imaging method may include simulating a camera 100 and/or lens 102, which may include an ECU 324 utilizing depth information 404 (e.g., a depth map 410, 422), a profile 406, one or more PSFs 408 (e.g., PSF information), and/or an initial/raw image 402. The ECU 324 may obtain/identify a focus area/point 460 in the depth map 410, 422. The focus area/point 460 may, for example and without limitation, be identified by a sensor (e.g., a first electronic sensor 320 and/or a second electronic sensor 322), be the center of the depth map 410, 422, and/or be user-specified. The ECU 324 may convert the depth map 410, 422 to a blur radius map 462, such as using the lens equation (the sum of 1 divided by object distance and 1 divided by image distance equals 1 divided by focal length). The conversion may include converting a depth value (e.g., in millimeters) to radius of blur on the color/light sensor. The ECU 324 may, in some embodiments, apply guided upscaling to the blur radius map 462. Guided upscaling may include edge refinement which may align blur edges with image edges.

In illustrative embodiments, the ECU 324 may generate quantized upscaled blur radius maps 464, 466, such as to the closest indices in PSF information (e.g., a PSF array). In some circumstances, the blur radius map 462 may include continuous blurring, but it may not be feasible to obtain, access, and/or utilize continuous PSF information (e.g., for continuous depths), and the ECU 324 may identify the available PSFs 408 for depths that are closest to a respective pixel, in front of the pixel and behind the pixel (block 472). For example, if the pixel has a depth of 1.9 m, but a PSF is not available for 1.9 m, the ECU 324 may select a first PSF 408 that is in front of the pixel (e.g., a PSF for 1.8 m) and a second PSF 408 that is behind the pixel (e.g., a PSF for 2.1 m). The ECU 324 may rotate, scale, and/or interpolate PSFs neighboring some or each pixel (block 476), such as to generate modified PSF information 478. For example, the ECU 324 may interpolate PSF information for the pixel at 1.9 m from the first and second PSFs 408, and may provide greater weight the first PSF 408 because it is closer to the depth of the pixel than the second PSF 408. The number of PSFs 408 available may, for example and without limitation, correspond to a log function relative to depth with a larger number of PSFs 408 available for smaller depths and the number of PSFs 408 available decreasing at an increasing rate as depth increases. In some circumstances, the ECU 324 may preprocess the PSF information (block 470), such as prior to identifying front and back neighbor PSFs. The quantization may be applied for each pixel. The ECU 324 may, in some examples, calculate residual scale and/or interpolation factors (block 474), such as prior to block 476.

With exemplary embodiments, the ECU 324 may covert the initial/raw image 402 to linear tone curve/gamma to generate a converted initial image 480, and/or the ECU 324 apply the per-pixel render procedure (block 482), which may be based, at least in part, on the converted initial image 480 and the modified PSF information 478, to provide an intermediate image 484. The per-pixel rendering (block 482) may include accumulation, normalization, and/or blending. Following the per-pixel render procedure (block 482), the ECU 324 may restore the tone-curve/gamma for the intermediate image 484 to generate a restored image 486. The ECU 324 may blend back sharp pixels in the foreground of the intermediate image 484, and/or output the intermediate image, as modified (e.g., restored and/or blended back), as an output image (e.g., final digital image 400).

Two illustrative approaches for simulating out-of-focus images may include scatter and gather. A scatter approach may yield optimal quality via layer-based rendering and alpha-blending. A scatter approach may be relative slow, but accurate. For example, a scatter approach may involve, at each layer, simulating spread of a source point to the output. A gather approach may not be quite as accurate but may be faster and/or may provide better graphics processing unit (GPU) shader compatibility. A gather approach may provide good approximations when using appropriate sampling and weighting strategy. A gather approach may simulate each output pixel and may map to the final image (e.g., directly) as weighted sum of input pixels. A gather approach may automatically account for foreground masking.

Figure 14:
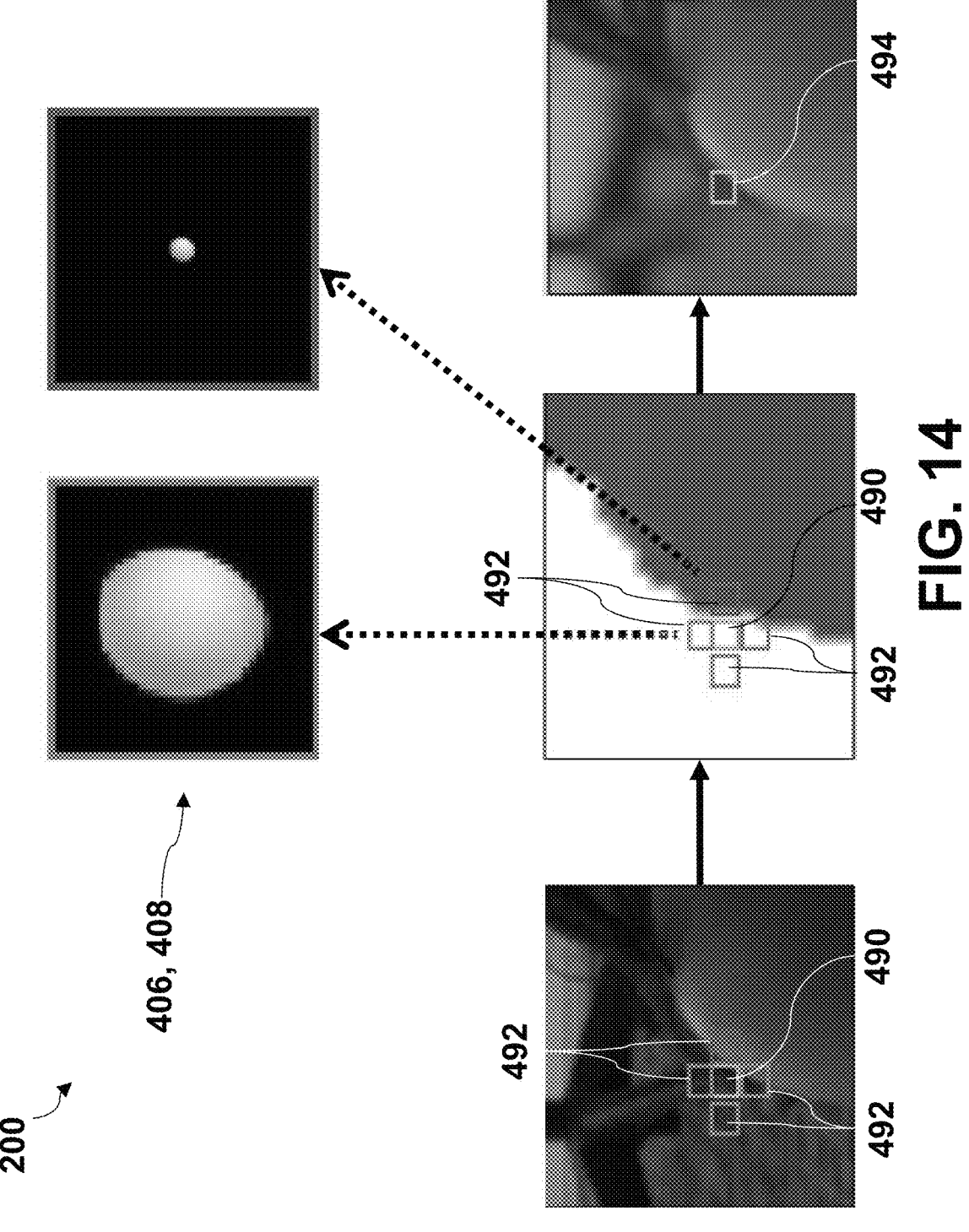
FIG. 14 is a flow diagram illustrating portions of an exemplary embodiment of an imaging method.

In exemplary embodiments, such as generally illustrated in FIG. 14, a per-pixel render process (e.g., block 482) may include, for each output pixel 490 (x,y) the ECU 324 initializing one or more accumulators, such as accumulators A (x,y), W (x,y), iterating over nearby pixels, and/or determining an output value (e.g., a modified version 494 of the output pixel 490). Initializing an accumulator may include assigning/allocating memory or other electronic storage for information for each pixel (e.g., blank images).

With exemplary embodiments, iterating over nearby pixels may include identifying one or more pixels 492 (i,j) (e.g., neighbor pixels) that are near/adjacent the location (x,y) of the output pixel 490. The locations (i,j) of the pixels 492 may be relative to the location (x,y) of the output pixel 490. The ECU 324 may obtain depth information, z(i,j) and/or light/color information c(i,j) for each neighbor pixel 492. The depth information, z(i,j) may be obtained from a depth map 410, 422 and/or a blur radius map 462. The light/color information may be obtained from a light/color sensor, such as may be included with the first electronic sensor 320. The ECU 324 may also obtain PSF information for each neighbor pixel 492, such as from a library 444 of PSFs 408. The depth associated with the neighbor pixel 492 may dictate which PSF 408 is used and the location of the neighbor pixel

492 may dictate which information is obtained from that PSF 408. The obtained PSF information may include light intensity information. In some circumstances, the PSF information may include color (e.g., RGB) intensity, so the PSF information may include three values. Such color information may be utilized in simulating color aberrations associated with a camera-lens combination 100/102.

In illustrative embodiments, the ECU 324 may use the obtained PSF information to create weighting factors, w(i,j). For example, if the obtained PSF information is a single value (e.g., one intensity value), the weighting factor w(i,j) may equal that single value. If the obtained PSF includes three values (e.g., RGB intensities), the weighting factor may include three values. The ECU 324 may apply blending during rendering, which may include adjusting the weights according to depth. For example, weights determined from closer PSFs may be increased and/or weights determined from farther PSFs may be decreased.

With exemplary embodiments, the ECU 324 may determine an accumulated value A(x,y) for the pixel according the sum of the products of the respective weights of the pixel and the neighbor pixels with the light/color information of the pixel and the neighbor pixels: $A(x,y)=\Sigma w(i,j)*c(i,j)$, for all i,j, including (0,0), which corresponds to the pixel itself, and for each pixel x,y. If the weight and the light/color information both include three values, the respective values of the weight (RGB) may be multiplied by the respective values of the light/color information (RGB). If the weight includes one value, that value may be multiplied by each value of the light/color information. The ECU 324 may determine a total weight W(x,y) as the sum of all of the weights w(i,j). The ECU 324 may determine output/modified color information for the pixel by dividing A(x,y) by W(x,y). The output/modified color information may, for example, include a weighted average of the color information for the pixel 490 and its neighbor pixels 492. A per-pixel render procedure (block 482) may be applied to each pixel of an image, such as sequentially and/or simultaneously.

In some configurations, a system 200 may include a default profile that may not correspond to a particular camera/lens combination 100/102. The system 200 may utilize the default profile if other profiles (e.g., of a camera 100, a lens 102, or a combination thereof) are not available, and/or the system 200 may ignore or delete the default profile when other profiles are available. The default profile may, at least initially, be stored on the mobile electronic device 300, such as on a memory 332.

One of more functions of a system 200 may be carried out, at least in part, via an ECU 324 of a mobile electronic device 300 and/or an ECU 446 of a remote server 440 (or processors 336, 448 associated therewith). One or more functions of an ECU 324 may be carried out, at least in part, via an ECU 446, and vice versa.

In examples, an ECU (e.g., ECU 324) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of generating a digital image, the method comprising:

obtaining a profile of a combination of a full-frame camera and a lens;

obtaining image information from an electronic sensor of a mobile electronic device; and generating, via an electronic control unit of the mobile electronic device, a final digital image by applying the selected full-frame profile to the image information so as to simulate the imaging characteristics of the full-frame camera and lens on the mobile device sensor data;

wherein the image information includes color information and depth information;

wherein the depth information includes a depth map;

wherein generating the final digital image includes:

identifying a focus area in the depth map;

converting the depth map to a blur radius map;

applying guided upscaling to the blur radius map;

quantizing the upscaled blur radius map to the closest indices in PSF information of the profile;

wherein the full-frame camera includes a color sensor that has a larger area than an area of the electronic sensor of the mobile electronic device.

2. The method of claim 1, wherein the profile includes a point spread function.

3. The method of claim 1, wherein obtaining the profile includes operating the full-frame camera and the lens to generate a point spread function.

4. The method of claim 3, wherein operating the full-frame camera and the lens to generate the point spread function includes capturing one or more profile images of an electronic display.

5. The method of claim 4, wherein the electronic display displays a plurality of white circles on a black background; and the electronic display incudes an OLED display.

6. The method of claim 1, wherein the profile is obtained from an electronic library of profiles of respective combinations of full-frame cameras and lenses.

7. The method of claim 6, wherein the electronic library is stored on a memory of the mobile electronic device.

8. The method of claim 6, wherein the electronic library is stored on a remote server; and obtaining the profile includes the mobile electronic device wirelessly communicating via a global computer network to access the profile from the electronic library.

9. The method of claim 1, wherein the mobile electronic device includes a cellular transceiver.

10. The method of claim 1, including deleting or ignoring default profile information of the mobile electronic device.

11. The method of claim 1 wherein obtaining the profile of a combination of a full-frame camera and lens includes operating a full-frame camera and the lens to generate one or more point spread functions.

12. An imaging system, comprising:

a plurality of electronic profiles of combinations of full-frame cameras and lenses stored in an electronic memory; and a mobile electronic device configured to obtain image information via an electronic sensor of the mobile electronic device;

wherein the mobile electronic device is configured to generate, via an electronic control unit of the mobile electronic device, a final digital image by retrieving a selected full-frame camera and lens profile from the plurality of electronic profiles and applying it to the image information to render the image with simulated optical characteristics of the full-frame camera;

wherein the image information includes color information and depth information;

wherein the depth information includes a depth map;

wherein generating the final digital image includes:

identifying a focus area in the depth map;

converting the depth map to a blur radius map;

applying guided upscaling to the blur radius map; and quantizing the upscaled blur radius map to the closest indices in PSF information of the profile;

wherein the full-frame camera includes a color sensor that has a larger area than an area of the electronic sensor of the mobile electronic device.

13. The system of claim 12, wherein the mobile electronic device includes the electronic memory.

14. The system of claim 12, including a remote computer server including the electronic memory;

wherein the mobile electronic device is configured to communicate with the remote server wirelessly to access the plurality of electronic profiles.

15. The system of claim 12, wherein the profile includes point spread function information stored in the electronic memory as a one-dimensional array; and applying the profile includes applying the point spread function information as a function of radial distance.

16. The system of claim 12, wherein the plurality of electronic profiles include a plurality of PSFs for a plurality of depths and focal distances for each combination of full-frame camera and lens.

17. The system of claim 12 wherein each of the plurality of electronic profiles of combinations of full-frame cameras and lenses stored in an electronic memory is obtained by operating a full-frame camera and the lens to generate one or more point spread functions.

* * * * *